United States Patent
Carolla et al.

(10) Patent No.: US 10,065,391 B2
(45) Date of Patent: Sep. 4, 2018

(54) INTEGRAL SELF-SUPPORTING COMPOSITE REFRACTORY COMPONENTS AND METHODS OF MAKING THE SAME

(71) Applicant: FOSBEL, INC., Brook Park, OH (US)

(72) Inventors: Lou Carolla, Brook Park, OH (US); Michael Smith, Brook Park, OH (US); Alan E. Bowser, Jr., Brook Park, OH (US)

(73) Assignee: FOSBEL, INC., Brook Park, OH (US)

( * ) Notice: Subject to any disclaimer, the term of this patent is extended or adjusted under 35 U.S.C. 154(b) by 135 days.

(21) Appl. No.: 15/013,245

(22) Filed: Feb. 2, 2016

(65) Prior Publication Data

US 2016/0221296 A1 Aug. 4, 2016

Related U.S. Application Data

(60) Provisional application No. 62/111,390, filed on Feb. 3, 2015.

(30) Foreign Application Priority Data

Feb. 25, 2015 (GB) .................. 1503119.8

(51) Int. Cl.

| B32B 3/28 | (2006.01) |
|---|---|
| B32B 3/30 | (2006.01) |
| B32B 3/14 | (2006.01) |
| B32B 7/12 | (2006.01) |
| B32B 18/00 | (2006.01) |
| B32B 37/10 | (2006.01) |
| B32B 37/12 | (2006.01) |

(Continued)

(52) U.S. Cl.
CPC .................. *B32B 3/28* (2013.01); *B32B 3/14* (2013.01); *B32B 3/30* (2013.01); *B32B 7/12* (2013.01); *B32B 18/00* (2013.01); *B32B 37/10* (2013.01); *B32B 37/12* (2013.01); *C10B 29/02* (2013.01); *E04C 1/39* (2013.01); *F23M 5/02* (2013.01); *F23M 5/06* (2013.01); *F27D 1/027* (2013.01); *F27D 1/14* (2013.01); *F27D 1/1621* (2013.01); *B32B 2419/00* (2013.01); *C04B 2237/02* (2013.01); *C04B 2237/78* (2013.01)

(58) Field of Classification Search
CPC ....................................................... B32B 3/28
USPC ........................................................... 428/49
See application file for complete search history.

(56) References Cited

U.S. PATENT DOCUMENTS

| 3,489,401 | A | 1/1970 | Merdian et al. |
| 2002/0189509 | A1* | 12/2002 | Kassau ............ E04C 3/02 110/331 |
| 2006/0272264 | A1 | 12/2006 | Parker |

FOREIGN PATENT DOCUMENTS

| EP | 1 255 088 | 4/2002 |
| GB | 736104 | 8/1955 |

(Continued)

OTHER PUBLICATIONS

International Search Report and Written Opinion, PCT/US20016/016105, dated Apr. 4, 2016.
Search Report for GB 1503119.8, dated Jul. 27, 2015, 2 pages.

*Primary Examiner* — Brent T O'Hern
(74) *Attorney, Agent, or Firm* — Nixon & Vanderhye P.C.

(57) ABSTRACT

Refractory components (e.g. crown or rider arches associated with a refractory structure such as coke ovens, glass furnaces, regenerators and the like) are provided by multiple refractory members bonded to one another by a bonding agent to form an integral self-supporting structure.

4 Claims, 4 Drawing Sheets

(51) Int. Cl.
  *E04C 1/39* (2006.01)
  *C10B 29/02* (2006.01)
  *F27D 1/02* (2006.01)
  *F27D 1/14* (2006.01)
  *F27D 1/16* (2006.01)
  *F23M 5/02* (2006.01)
  *F23M 5/06* (2006.01)

(56) References Cited

FOREIGN PATENT DOCUMENTS

| GB | 938363 | 10/1963 |
| GB | 945640 | 1/1964 |
| GB | 1386898 | 3/1975 |
| GB | 2 070 216 | 9/1981 |
| JP | 2007-263447 | 11/2007 |

\* cited by examiner

INTEGRAL SELF-SUPPORTING COMPOSITE REFRACTORY COMPONENTS AND METHODS OF MAKING THE SAME

CROSS-REFERENCE TO RELATED APPLICATIONS

This application is based on and claims domestic priority benefits under 35 USC § 119(e) from U.S. Provisional Application Ser. No. 62/111,390 filed on Feb. 3, 2015 and also claims foreign priority benefits under 35 USC § 119(a) from GB 1503119 filed on Feb. 25, 2015, the entire contents of each such prior filed application being expressly incorporated hereinto by reference.

FIELD

The embodiments disclosed herein relate generally to integral self-supporting composite refractory components formed of multiple refractory bricks and/or blocks integrally bonded together and to methods for making such structures.

BACKGROUND

Several industries employ relatively massive refractory structures formed of refractory bricks of varying sizes and shapes. For example, coke ovens and glass furnaces, including regenerators associated with such furnaces, traditionally comprise massive refractory brick structures having relatively large-scale parallel walls, crown arches and floor arches (typically termed rider arches in art parlance) constructed from a large variety of differently shaped individual refractory bricks. The construction and repair of such refractory structures can be extremely tedious and time consuming due to the individual refractory brick construction thereby resulting in costly downtime and a concomitant economic loss.

Recently, it has been proposed to provide relatively monolithic refractory components to reduce the number of individual bricks forming the refractory structures and thereby reduce the downtime required to construct and/or repair the refractory structure. See in this regard, U.S. Pat. Nos. 8,640,635, 8,266,853 and 6,066,236 and copending U.S. Provisional Patent Application Ser. No. 62/111,447 filed on Feb. 3, 2015, the entire contents of each such patent and pending patent application being expressly incorporated hereinto by reference.

While these prior proposals are satisfactory, continual improvement in the construction and repair/servicing of relatively massive refractory structures (e.g., coke ovens, glass furnaces, forehearths, regenerators and the like) is sought. For example, it would be desirable if integral self-supporting refractory components could be formed from existing relatively smaller refractory brick and/or relatively larger refractory block so that the refractory components could be formed remotely and then transported to the point of use for installation. This off-site fabrication of the refractory components could in turn produce extensive labor cost savings since individual bricks/blocks would not need to be assembled on site. It is towards providing such improvement that the embodiments of the invention described herein are directed.

SUMMARY

In general, the embodiments disclosed herein are directed toward refractory components (e.g. crown or rider arches associated with a refractory structure such as coke ovens, glass furnaces, regenerators and the like) that are formed by multiple refractory members bonded to one another by a bonding agent to provide an integral self-supporting structure.

The refractory members may comprise at least one of refractory bricks or blocks (as defined below) which may be pressed or cast.

The bonding agent which bonds the multiple refractory members to one another may either be a sacrificial or non-sacrificial bonding agent. According to some embodiments, the bonding agent is a high temperature epoxy adhesive bonding agent.

According to some embodiments, the refractory component may be in the form of a refractory arch component comprised of a pair of skewback bricks and multiple arch bricks between the skewback bricks, wherein adjacent ones of the arch and skewback bricks are bonded to one another with the bonding agent. The refractory arch component may further comprise springer bricks bonded to adjacent respective ones of the arch bricks and the skewback bricks. The refractory arch component may alternatively or additional comprise a pair of haunch bricks bonded to adjacent ones of the arch bricks and extending outwardly from an arch face defined by the arch bricks. Some embodiments will include multiple courses of creeper bricks bonded to one another and to the arch bricks.

According to other embodiments, the refractory component may be in the form of a segmented refractory rider arch comprised of multiple refractory blocks bonded to one another. The refractory rider arch may include a bridge region having opposed parallel vertically planar opposed pairs of end web sections defining therebetween a respective pair of vertically planar lateral channels, and a central web section defining therebetween a vertically planar central channel positioned between the lateral channels. The bridge region may include a pair of downwardly and inwardly convergent latitudinal rib elements separating the lateral channels from the central channel. The refractory rider arch may be longitudinally bisected and latitudinally split along the rib elements to establish the respective multiple refractory blocks bonded to one another.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

DETAILED DESCRIPTION

As used herein and in the accompanying claims, the term "brick" is intended to refer to a generally small sized solid refractory member that may be readily handled and manipulated manually by a laborer (e.g., a bricklayer). The term "block" is intended to refer to a generally large sized solid refractory member that requires mechanical assistance for handling and manipulation (e.g., via suitable hoists, lifts and the like). More specifically, a "block" as used herein and the accompanying claims is intended to refer to a refractory member whose weight cannot be lifted manually by a single individual in accordance with generally accepted guidelines according to the US Occupational Safety and Health Administration (OSHA), e.g., typically an object which weighs more than about 50 pounds. Conversely, as used herein and in the amended claims, the term "brick" refers to a generally small sized solid refractory member that may easily be handled and manipulated by a single individual in accordance with the generally accepted OSHA guidelines, e.g., typically an object weight less than about 50 pounds.

The refractory "brick" and "block" members employed by the embodiments disclosed herein are most preferably formed of a refractory material (e.g., fused silica) that is mechanically pressed and cured at high temperatures (e.g., up to about 1400° C.) as described, for example, in U.S. Pat. Nos. 2,599,236, 2,802,749 and 2,872,328, the entire contents of each such patent being expressly incorporated hereinto by reference. If the refractory "block" members are of an exceptionally large size (e.g., block members having a size of generally about 650 mm or greater) may be formed by casting and heat curing a refractory material (e.g., fused silica) as described in U.S. Pat. Nos. 5,277,106 and 5,423,152, the entire contents of each such patent being expressly incorporated hereinto by reference.

Figure 1:
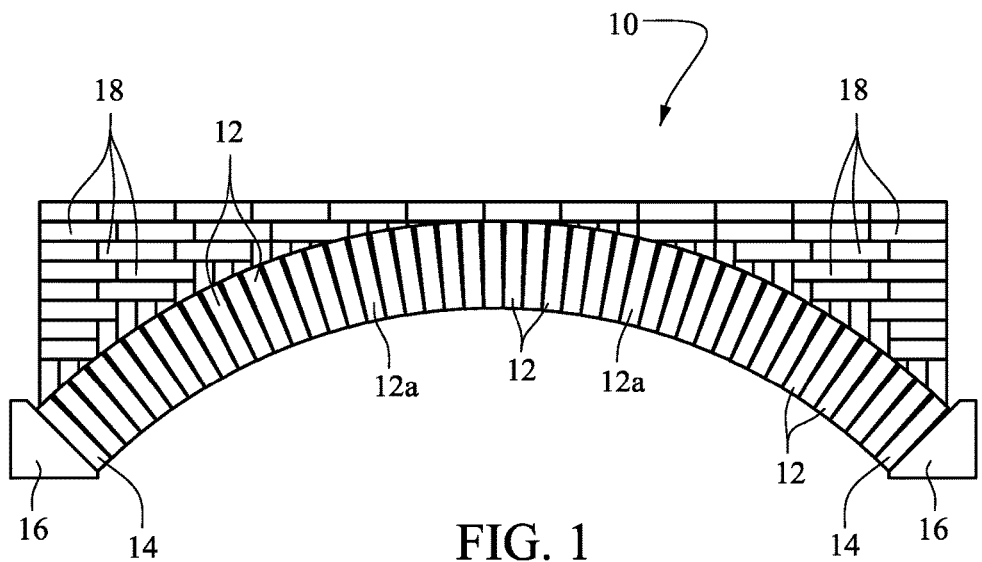
FIG. 1 is a front elevational view of a refractory arch component formed of multiple refractory bricks in accordance with an embodiment of the present invention.
Figure 2:
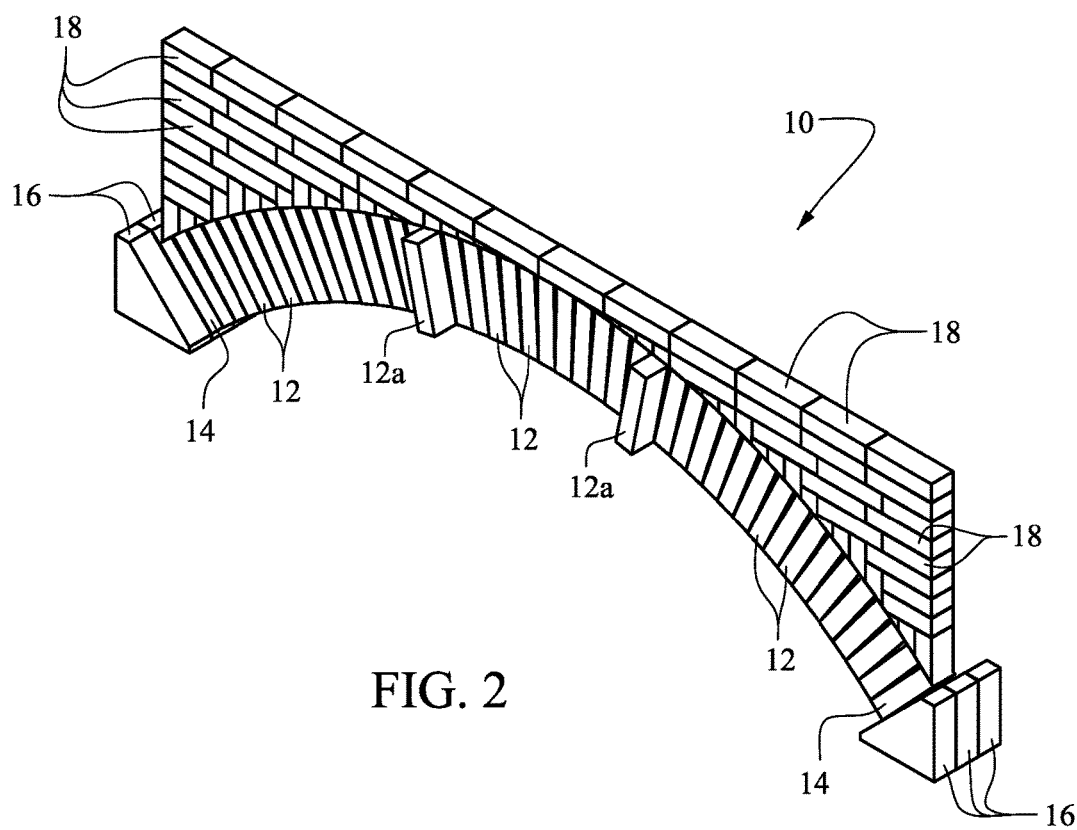
FIG. 2 is a front perspective view of the refractory arch component depicted in FIG. 1.

Accompanying FIGS. 1 and 2 depict a refractory arch component 10 formed of multiple refractory bricks in accordance with an embodiment of the present invention. More specifically, the arch component 10 is formed of individual elongate arch bricks (a representative few of which are identified by reference numeral 12 in FIGS. 1 and 2) that may or may not be tapered (e.g., voussoirs). Each springer brick 14 of the arch component 10 is supported against multiple adjacent skewback blocks 16. Several courses of creeper bricks (a representative few of which are identified by reference numeral 18) are laid onto the extrados curve formed by arch bricks 12.

As can be seen in FIG. 2, a pair of haunch bricks 12a forming the crown extend outwardly from the arch face a distance substantially equivalent to the width of the outermost skewback blocs 16. The outwardly extending pair of haunch bricks 12a thereby provide lateral support between adjacent similarly constructed arches when installed onto the arch support piers (not shown).

Important to the embodiments disclosed herein the adjacent ones of the bricks 12, 14, 16 and 18 are physically bonded to one another so that the collection of bonded bricks 12, 14, 16 and 18 form the arch component 10 as an integral self-supporting and transportable structure. Thus, the bricks 12, 14, 16 and 18 may be assembled, laid and/or otherwise conjoined to form the arch component 10. According to the embodiments disclosed herein, the bricks 12, 14, 16 and 18 are preferably bonded to one another by a suitable sacrificial or non-sacrificial bonding agent, such as an epoxy adhesive bonding agent. By the term "sacrificial bonding agent" is meant to refer to bonding agents that allow the refractory bricks and blocks to be bonded to one another to form an integral self-supporting transportable refractory component, but which are consumed or combusted in the high heat (e.g., temperatures of about 1100° C. to about 1650° C.) during use of the refractory structure in which the component is installed. The individual bricks or blocks forming the refractory component will remain intact when the sacrificial bonding agent is consumed or combusted by virtue of the refractory component design and the structural support provided by other refractory components installed to form the complete refractory structure. By the term "non-sacrificial bonding agent" is meant a bonding agent that remains intact and is not consumed or combusted at the high temperatures associated with the refractory structure in which the component is installed.

As noted above the preferred bonding agent is an epoxy adhesive bonding agent. As noted previously, the epoxy bonding agent may be sacrificial or non-sacrificial.

Figure 3:
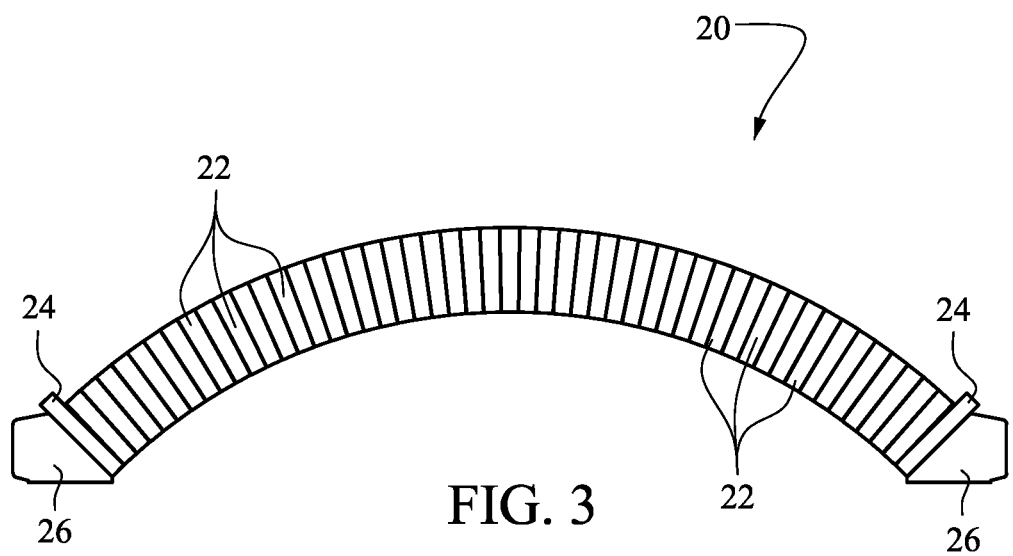
FIG. 3 is a front elevational view of a refractory arch component formed of multiple refractory bricks in accordance with yet another embodiment of the present invention.
Figure 4:
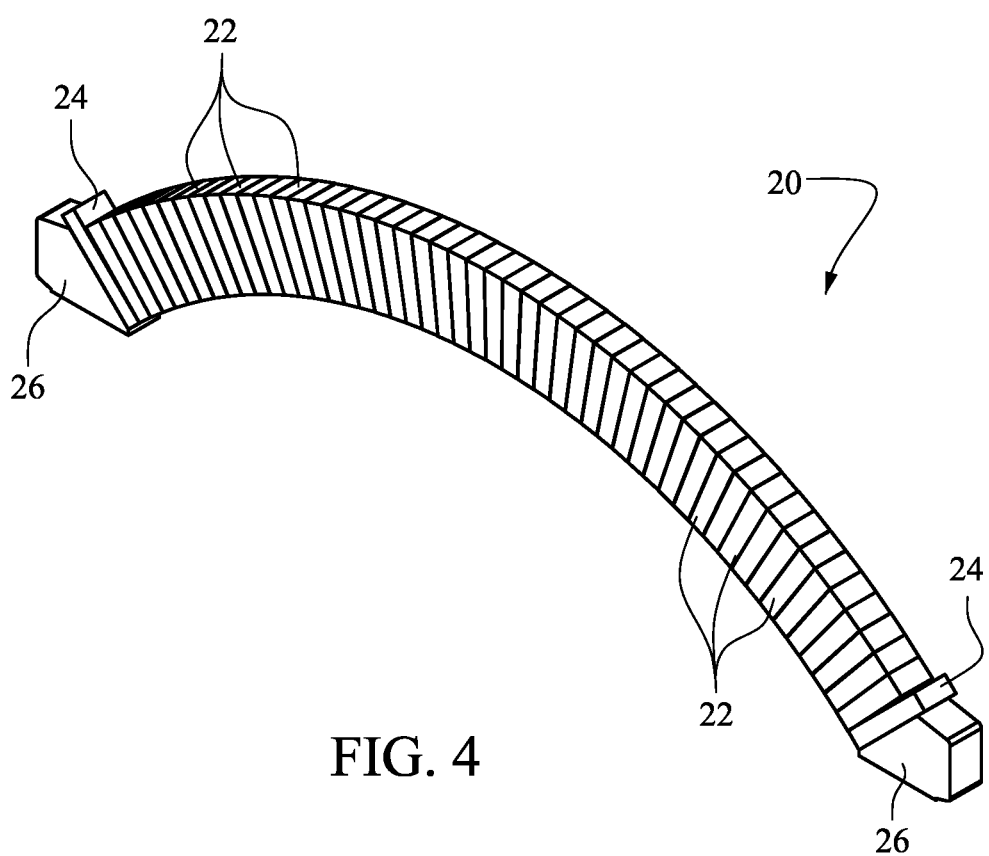
FIG. 4 is a front perspective view of the refractory arch component depicted in FIG. 3.

Accompanying FIGS. 3 and 4 depict another embodiment of an arch component 20 that may advantageously be employed as a crown arch in a glass furnace regenerator structure (see copending U.S. application Ser. No. 14/939,210 filed on Nov. 12, 2015), the entire content of which is expressly incorporated hereinto by reference). As is shown, the arch component 20 of FIGS. 3 and 4 is structurally similar to the arch component 10 described above in reference to FIGS. 1 and 2 as it is comprised of individual elongate arch blocks (a representative few of which are identified by reference numeral 22 in FIGS. 3 and 4) that may or may not be tapered (e.g., voussoirs). Springer bricks 24 of the arch component 20 are supported against adjacent skewback blocks 26 and have a greater face depth as compared to the arch blocks 22.

As with the embodiment of the arch component 10 described above in reference to FIGS. 1-2, adjacent ones of the bricks 22, 24 and 26 are physically bonded to one another so that the collection of bonded bricks 22, 24 and 26 form the arch component 20 as an integral self-supporting and transportable structure. Thus, the bricks 22, 24 and 26 may be assembled, laid and/or otherwise conjoined to form the arch component 20. The bricks 22, 24 and 26 are preferably bonded to one another by a suitable sacrificial or non-sacrificial bonding agent, such as an epoxy bonding agent as described previously.

Figure 5:
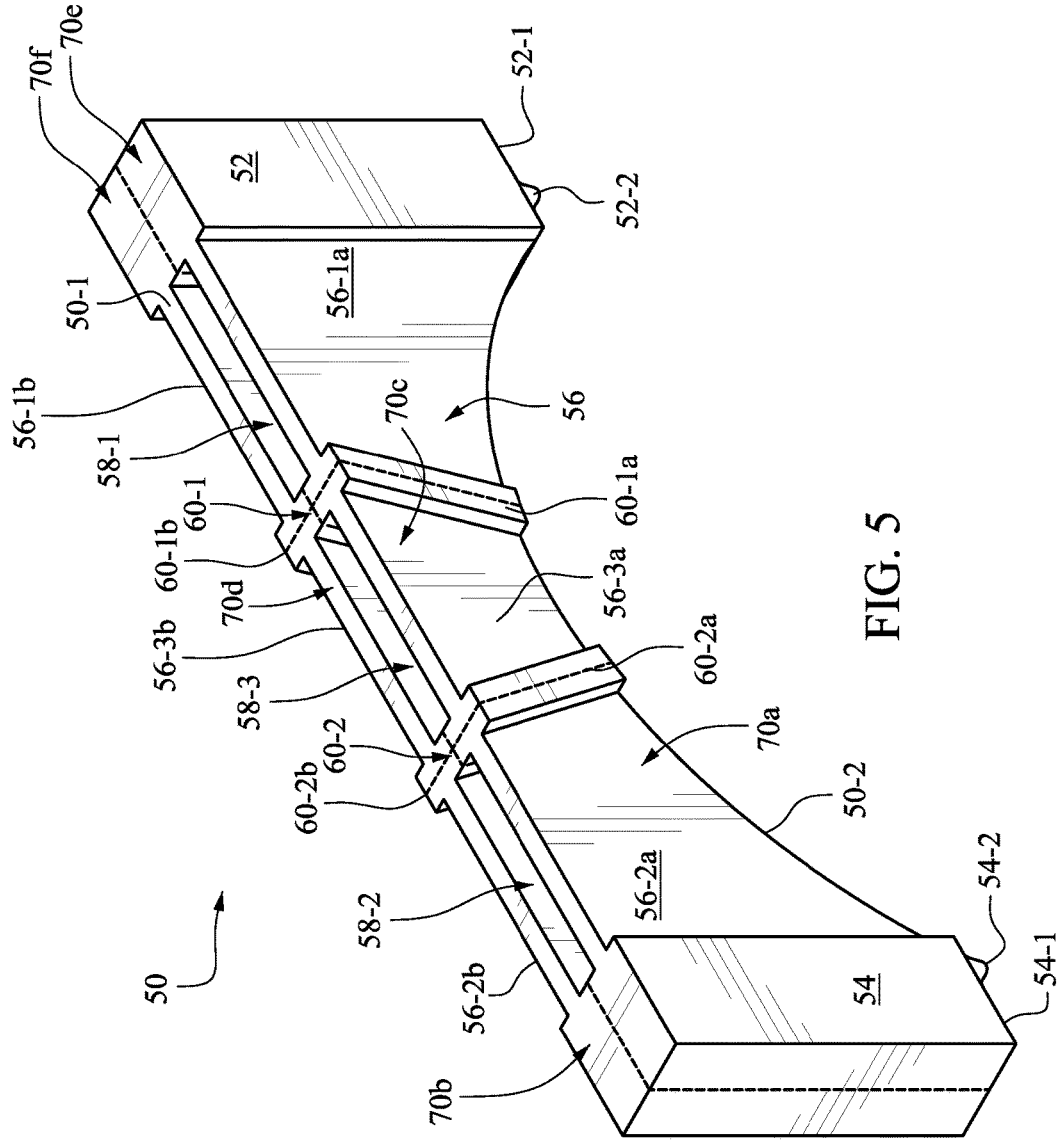
FIG. 5 is a front perspective view of a refractory rider arch component formed of refractory blocks in accordance with another embodiment of the present invention.

An exemplary rider arch 50 for a glass furnace regenerator is depicted in FIG. 5. As shown, the rider arch 50 includes opposed end block regions 52, 54 interconnected to one another by a central bridge region 56. The end block regions 52, 54 are generally vertically oriented and are adapted for being stacked onto a respective foundation block (not shown) associated with the regenerator structure. In order to provide interlocking relationship with the foundation blocks of the regenerator structure and to minimize loss of combustion air and gasses, the bottom surface 52-1, 54-1 of each end block 52, 54 may be provided with an elongate tongue 52-2, 54-2 cooperating with an correspondingly shaped groove formed on an upper surface of the immediately subjacent foundation block.

The central bridge region 56 interconnects the end block regions 52, 54 and defines the upper horizontal surface 50-1 of the rider arch 50. The bridge region 56 also includes a lower arcuate surface 50-2 opposite to the upper horizontal surface 50-1 extending from each of the lower surfaces 52-1, 54-1 of the end blocks 52, 54, respectively. An apex of the lower arcuate surface 50-2 is generally located at a latitudinal midplane of the bridge region 56.

The bridge region 56 includes opposed parallel vertically planar pairs of end web sections 56-1a, 56-1b and 56-2a, 56-2b, respectively, and an opposed parallel vertically planar pair of central web sections 56-3a, 56-3b. Vertical planar channels 58-1, 58-2 and 58-3 are thus defined between the opposed pairs of web sections 56-1a and 56-1b, 56-2a and 56-2b, and 56-3a and 56-3b, respectively. A pair of downwardly and inwardly convergent latitudinal rib elements 60-1, 60-2 separate the lateral channels 58-1 and 58-2 from the central channel 58-3.

Each of the rib elements 60-1, 60-2 terminate in an opposed pair of lateral spacer ribs 60-1a, 60-1b and 60-2a, 60-2b, respectively. The lateral spacer ribs 60-1a, 60-1b and 60-2a, 60-2b of each rider arch 50 cooperate with adjoining spacer ribs 60-1a, 60-1b and 60-2a, 60-2b of an adjacently positioned rider arch 50 in the regenerator structure so as to establish collectively respective sets of vertically oriented channels 62-1, 62-2 and 62-3. Thus, the channels 58-1, 58-2 and 58-3 formed by an individual one of the rider arches 50 as well as the vertically oriented channels 62-1, 62-2 and 62-3 formed by adjacently positioned pairs of the rider arches 50 will allow combustion air and gases in the space 14-2 to communicate with the checker bricks (not shown) supported by the floor established by the upper planar surface 50-1 of the rider arches 50.

As is shown in FIG. 5, the rider arch 50 may be segmented along the dashed lines depicted therein so as to establish respective refractory blocks 70a-70f that may be pre-formed (e.g., by pressing or casting) and assembled by a bonding agent (e.g., a sacrificial or non-sacrificial epoxy bonding agent as described previously), so that as to form rider arch 50. Thus, the rider arch may be bisected longitudinally and latitudinally so as to substantially split the lateral spacer ribs 60-1a, 60-1b and 60-2a, 60-2b. In this regard, it will be observed that the refractory blocks 70c and 70d will thereby serve as keystones for the rider arch 50 to thereby maintain its structural integrity in use even should a sacrificial epoxy be employed for bonding.

Figure 6:
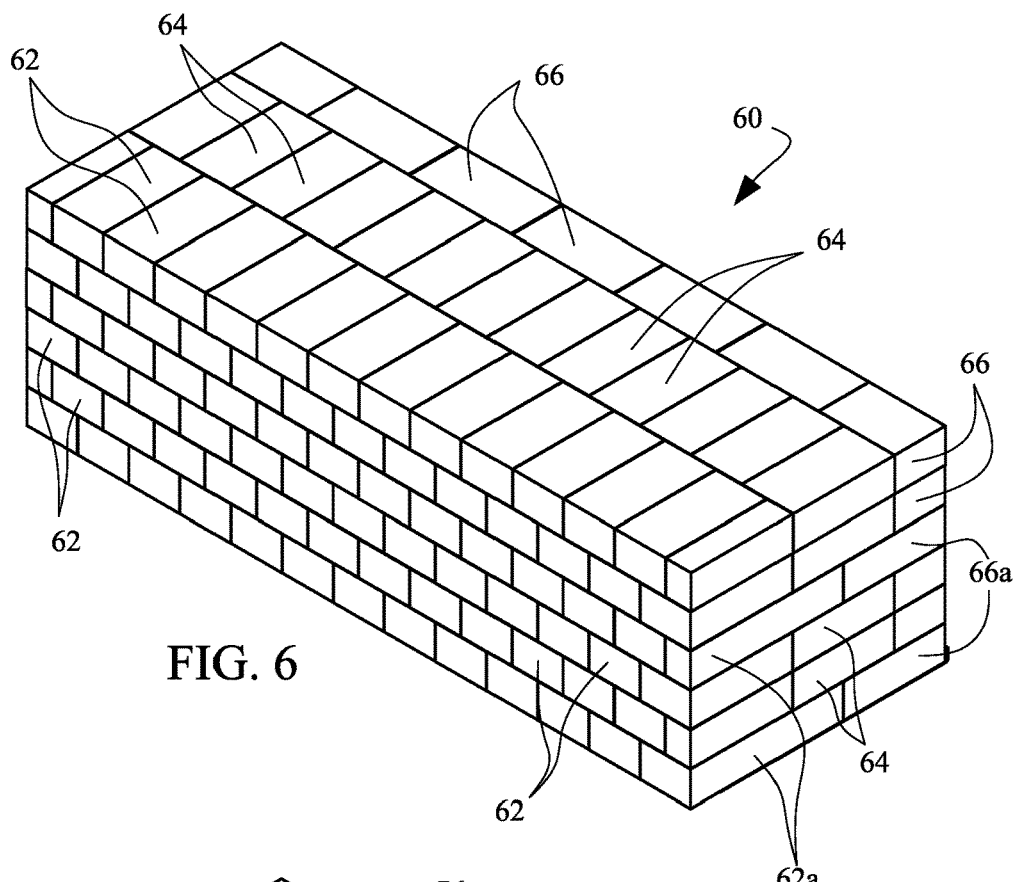
FIG. 6 is a perspective view of refractory wall module component according to another embodiment of the present invention.
Figure 7:
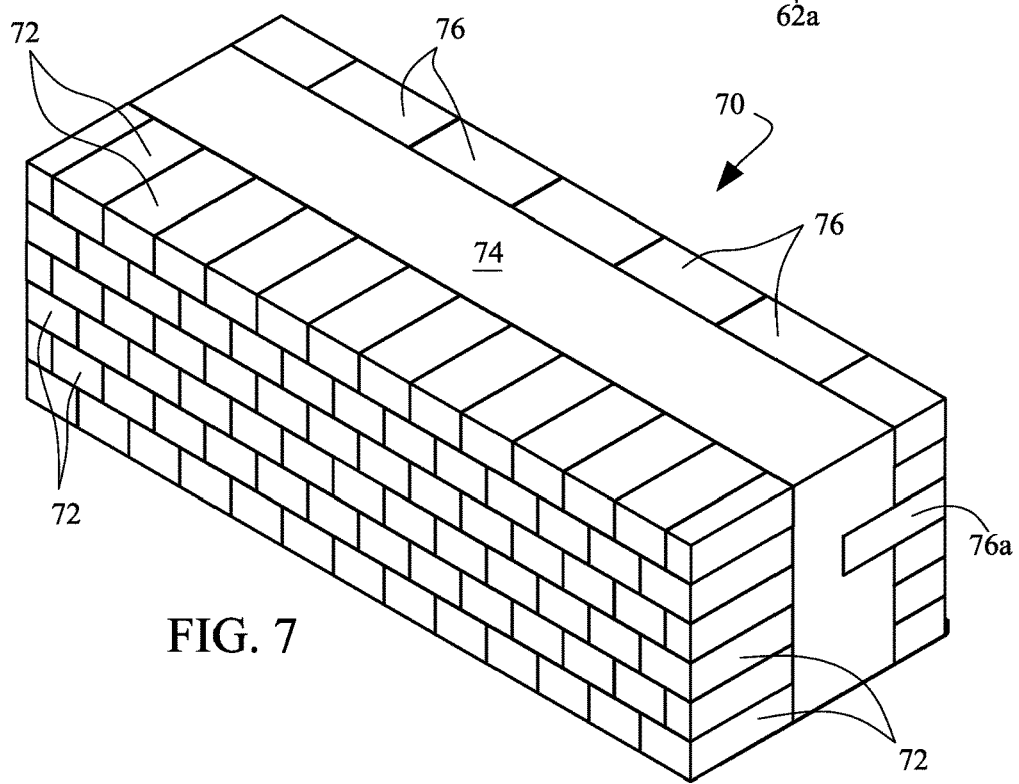
FIG. 7 is a perspective view of a refractory wall module component according to yet another embodiment of the present invention.

The refractory components as described herein may also be embodied in the form of self-supporting weight-bearing wall modules 60, 70 as depicted in accompanying FIGS. 6 and 7, respectively. In this regard, FIG. 6 depicts a self-supporting wall module 60 having formed of several courses of exterior, intermediate and interior bricks (a representative few of which are identified in FIG. 6 by reference numerals 62, 64 and 66, respectively). The bricks 62, 64 and 66 preferably vary compositionally one from another so as to have different relative thermal transfer characteristics to thereby allow the module 60 to be "engineered" to exhibit a thermal transfer gradient across its cross-sectional dimension from the exterior (cold) side of the wall module 60 to the interior (hot) side of the wall module 60.

Similar to the embodiments described previously, each of the bricks 62, 64, 66 will be bonded to adjacent bricks by a suitable sacrificial or non-sacrificial bonding agent, such as an epoxy adhesive bonding agent. As such, the bonded bricks 62, 64, 66 will form a self-supporting module 60 that may be integrally lifted and/or maneuvered (e.g., by suitable hoisting apparatus) as a one-piece structural element and placed into a wall of a refractory structure. In the interest of improved structural integrity, one or more of the courses will include dimensionally extended bricks (depicted in FIG. 6 by bricks 62a and 66a) without intermediate bricks therebetween that are bonded together at their abutted ends.

The embodiment of the module 70 depicted in FIG. 7 is similar to the module 60 described above in reference to FIG. 6 in that exterior and interior bricks 72, 76 are provided. However, unlike the module 60, the intermediate bricks 64 have been replaced by a monolithic cast intermediate block 74. The bricks 72, 76 and the intermediate block 74 may vary compositionally one from another so as to have different relative thermal transfer characteristics to thereby allow the module 70 to be "engineered" to exhibit a thermal transfer gradient across its cross-sectional dimension from the exterior (cold) side of the wall module 70 to the interior (hot) side of the wall module 70. In the interests of improved structural integrity, the block 74 may be cast so as to include a recessed tongue channel 74a to receive therein the bricks of at least one course that are dimensionally extended in a cross-sectional direction.

It will be understood that the description provided herein is presently considered to be the most practical and preferred embodiments of the invention. Thus, the invention is not to be limited to the disclosed embodiments, but on the contrary, is intended to cover various modifications and equivalent arrangements included within the spirit and scope thereof.

What is claimed is:

1. A segmented refractory rider arch comprising multiple refractory components bonded to one another by a bonding agent, wherein the refractory rider arch further comprises:
    an opposed pair of substantially vertically oriented end blocks;
    a central bridge region having an elongate web section having an upper horizontal surface and a lower arcuate surface opposite the upper horizontal surface, wherein
    the upper horizontal and lower arcuate surfaces extending between the opposed pair of substantially vertically oriented end blocks, and wherein
    the lower arcuate surface has an apex substantially at a latitudinal midplane of the central bridge region, and wherein
    the central bridge region is at least latitudinally segmented along a pair of opposite downwardly converging latitudinal planes to form a central keystone refractory bridge component and adjacent pairs of refractory bridge components that are bonded to one another by the bonding agent.

2. The refractory rider arch as in claim 1, wherein the central bridge region comprises:
    opposed parallel vertically planar opposed pairs of end web sections defining therebetween a respective pair of vertically planar lateral channels, and
    a central web section defining therebetween a vertically planar central channel positioned between the lateral channels, and
    a pair of downwardly and inwardly convergent latitudinal rib elements separating the lateral channels from the central channel.

3. The refractory rider arch as in claim 2, wherein the refractory rider arch is latitudinally split along the rib elements to establish the central keystone refractory bridge component and the adjacent pairs of refractory bridge components which are bonded to one another by the bonding agent.

4. The refractory rider arch as in claim 1, wherein the bonding agent is an epoxy adhesive.

\* \* \* \* \*